EMISSION SPECTRA OF $(YEuBi)_2O_3$
(3650 Å EXCITATION)

$1 - (Y_{.945}Eu_{.05}Bi_{.005})_2O_3$
$2 - (Y_{.948}Eu_{.05}Bi_{.002})_2O_3$
$3 - (Y_{.995}Bi_{.005})_2O_3$
$4 - (Y_{.998}Bi_{.002})_2O_3$
$5 - (Y_{.95}Eu_{.05})_2O_3$

PLAQUE BRIGHTNESS VS CONCENTRATION
IN $R_2O_3$ (R=Gd,Y)
(3650 Å EXCITATION)

Inventor:
Ranajit K. Datta
by *Richard H. Burgess*
His Attorney

United States Patent Office 3,475,342
Patented Oct. 28, 1969

3,475,342
RARE-EARTH OXIDE PHOSPHORS ACTIVATED WITH BISMUTH
Ranajit K. Datta, East Cleveland, Ohio, assignor to General Electric Company, a corporation of New York
Filed Oct. 31, 1966, Ser. No. 590,891
Int. Cl. C09k 1/04, 1/10; H01j 29/20
U.S. Cl. 252—301.4                 6 Claims

ABSTRACT OF THE DISCLOSURE

The present invention provides a new luminescent materials based on matrices of $Ln_2O_3$ (Ln=La, Y, Gd or solid solution combinations thereof) to which trivalent bismuth is added as an activator. These phosphors show broadband blue emission under 3650 A. excitation. Trivalent europium may also be used as an activator in addition to the bismuth. In these phosphors, $Bi^{+3}$ substantially enhances red emission in response to long-wavelength excitation such as 3650 A. radiation.

---

This invention relates to luminescent materials which generate visible radiations of varying colors, depending upon the activators used. More particularly, it concerns rare-earth oxides of controlled composition for improved light production.

As is generally known, luminescent materials or phosphors usually consist of a base material (matrix) in which a small concentration of another ion (activator) is incorporated. They are useful in the form of many small crystals for producing light in lamps or in cathode-ray tubes, and as relatively large single crystals in lasers.

Recently many phosphor systems have been reported where rare-earth oxides constitute either the main matrix or an important component of the matrix. $(LnEu)_2O_3$, where Ln stands for lanthanum, yttrium and gadolinium, has been discussed in various publications as a useful luminescent material, especially for application as the red phosphor in color television. The amount of europium (+3 valence state) oxide added to yttrium oxide, for example, is normally between 3 and 8 mole percent, particularly good results being obtained with a concentration of approximately 4–5 mole percent. This phosphor emits a narrow-band spectrum in the region of 5900 to 7100 angstrom units (A.), a very strong maximum occurring at about 6100 A. This emission is very typical of $Eu^{+3}$-activated phosphors and is often referred to as $Eu^{+3}$ emission. Although quite efficient under cathode-ray or short-wavelength ultraviolet excitations, this phosphor has very poor response to long-wavelength ultraviolet excitation (3650 A. radiation, for example). However, related materials with improved luminescent properties such as brightness and maintenance are constantly being sought.

It is the general object of this invention to provide new and improved phosphor materials having a matrix consisting essentially of rare-earth oxide.

It is an additional object of the present invention to modify compositions of the phosphor materials $Ln_2O_3$:Eu (Ln=La, Y, Gd) to provide phosphors having different and improved luminescent characteristics including efficiency and spectral distribution.

Further objects and advantages of the invention will appear from the following detailed description of species thereof and from the accompanying drawings.

Figure 1:
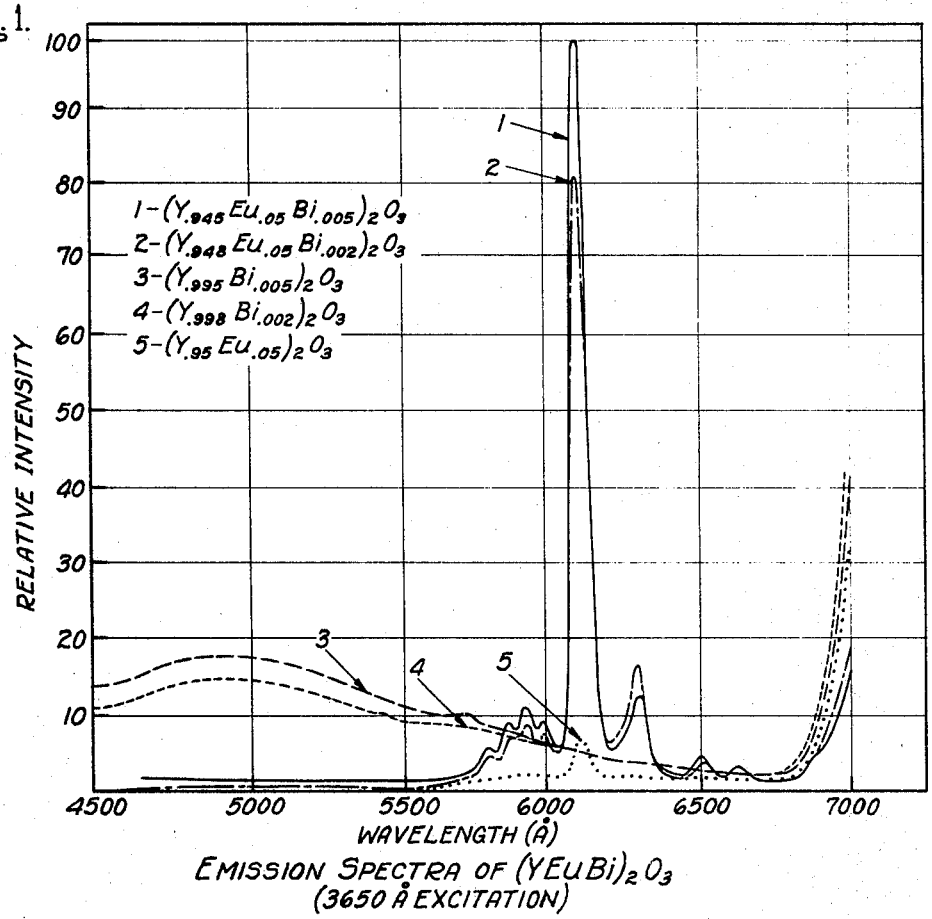
Figure 2:
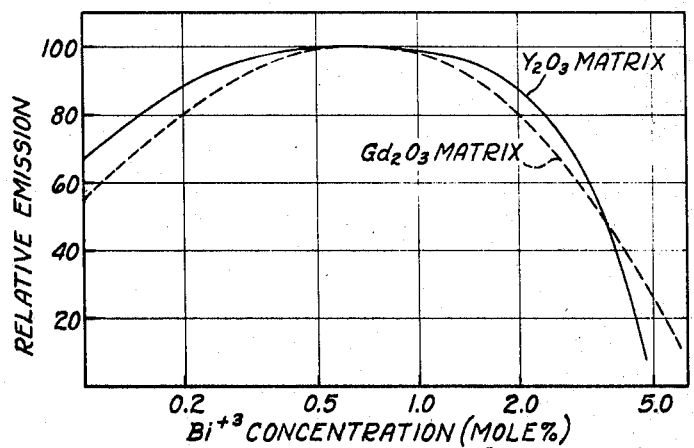

In the drawing, FIG. 1 is a graph of the intensity versus spectral distribution for luminescent materials of the invention compared with one of the prior art. FIG. 2 is a graph showing the effect on emission of various bismuth contents in two phosphors of the invention.

Briefly stated, the present invention in its main aspects provides for the addition of bismuth in small quantities effective to improve luminescent characteristics of $Ln_2O_3$:Eu (Ln=La, Y, Gd or combinations thereof) phosphors. The concentration of $Bi^{+3}$, preferably, is controlled between about 25 moles per million moles of the phosphor, herein referred to as p.p.m. (moles) and about 7 mole percent of the phosphor.

For the preparation of luminescent materials according to the invention, a mixture of the rare-earth oxide used for the matrix (Y, Gd or La oxide) and bismuth oxide or a mixture of the rare-earth oxide, bismuth oxide and europium oxide may be fired; alternatively, in the initial mixture, instead of the oxides, compounds may be used which produce the oxides when heated, as for example the oxalates, carbonates or nitrates.

In accordance with the present invention, new fluorescent compositions of matter suitable for converting cathode rays, X-rays and ultraviolet radiations to visible radiations have been developed. The host lattices of the compositions are of cubic or hexagonal structure, depending on the composition, and are lanthanum, yttrium and gadolinium oxide, in which restricted amounts of the rare-earth ion have been replaced with bismuth ($Bi^{+3}$) or bismuth and europium in +3 valency state. The compositions have the general empirical formula:

$$(Ln_{1-x-y}Bi_xEu_y)_2O_3$$

where Ln is at least one element selected from the group consisting of lanthanum, yttrium and gadolinium. When the matrix consists essentially of $Y_2O_3$, $Gd_2O_3$ or $(Y, Gd)_2O_3$, the structure is cubic; when it is essentially $La_2O_3$, the structure is hexagonal. Various combinations of these oxides, that is, either two or all three of them, can be incorporated together to form the matrix. However, for obtaining the most efficient phosphors, the combination of oxides preferably should be such that the resulting product consists of one rather than two phases. The subscripts in the above formula signify the relative number of gram atoms of the elements indicated which are present and thus are also proportional to the relative number of atoms of each element present in the composition. The concentrations of $Eu^{+3}$ and $Bi^{+3}$ can vary about from 0 to 8 mole percent and 25 p.p.m. (moles) to 5 mole percent of phosphors respectively. This is equivalent to specifying $x=0.000025$ to 0.05 and $y=0$ to 0.08. However, when bismuth is the only activator, i.e., $y=$zero, the optimum values of $x$ are from 0.002 to 0.025. When $Bi^{+3}$ and $Eu^{+3}$ are incorporated together, $y$ has an optimum value ranging from 0.03 to 0.06, and the concentration of $Bi^{+3}$ may vary about from 25 p.p.m. (moles) to one mole percent of phosphor ($x=0.000025$ to 0.01).

FIG. 1 shows the spectral response of bismuth-activated yttrium oxide and the influence of bismuth incorporation in the lattice of $Y_2O_3$:Eu phosphor on the $Eu^{+3}$ emission of $Y_2O_3$:Eu excited under 3650 A. radiation, especially the enhancement of the maximum emission peak at 6100 A.

Normalized plots of plaque brightness against logarithm of $Bi^{+3}$ concentrations in $Y_2O_3$ and $Gd_2O_3$ are shown in FIG. 2.

Specific examples describing the preparation of luminescent materials in accordance with the present invention will now be given.

EXAMPLE I $(Y_{.995}Bi_{.005})_2O_3$ 4.517 grams of $Y_2O_3$ and 0.0466 gram of $Bi_2O_3$ were dissolved in dilute $HNO_3$. About 70 milliliters (ml.) of one molar oxalic acid solution was added to the nitrate solution. The precipitate was separated from the mother liquor, dried and fired at 700–900° C. for 60–90 minutes. The final product is a white powder having the composition $(Y_{.995}Bi_{.005})_2O_3$; when excited with 3650 A. radiations, it emits a broad band extending from 4500 to 6500 A. with a peak at about 5000 A.

EXAMPLE II $(Y_{.495}Gd_{.495}Bi_{.01})_2O_3$ 3.618 grams of $Gd_2O_3$, 2.225 grams of $Y_2O_3$ and 0.093 gram of $Bi_2O_3$ were dissolved in dilute $HNO_3$. About 70 ml. of one molar oxalic acid solution was added to the nitrate solution. The precipitate was separated from the mother liquor, dried and fired at 700–900° C. for 60–90 minutes. The final product is a white powder having a composition $(Y_{.495}Gd_{.495}Bi_{.01})_2O_3$. The emission characteristics of the sample are the same as described in Example I.

EXAMPLE III $(Y_{.945}Eu_{.05}Bi_{.005})_2O_3$

To illustrate the addition of Eu in the same operation, 4.268 grams of $Y_2O_3$, 0.352 gram of $Eu_2O_3$, and 0.0466 gram of $Bi_2O_3$ were dissolved in dilute $HNO_3$. 70 ml. of one molar oxalic acid solution was added to the nitrate solution. The precipitate was separated from the mother liquor, dried and fired at 700–1100° C. for 60–90 minutes to form $(Y_{.945}Eu_{.05}Bi_{.005})_2O_3$. This phosphor, when excited by cathode rays and ultraviolet radiations (both short and long wavelength), emits predominantly in the form of a line spectrum, as contrasted to a continuous or band spectrum as emitted by $(YBi)_2O_3$; the primary emission lines are approximately as follows, as given in angstroms: 5925, 6100 (maximum) and 6300.

Table I below demonstrates the beneficial effects on brightness under cathode-ray and 3650 A.-radiation excitations achieved by addition of $Bi^{+3}$ to $Ln_2O_3$:Eu (Ln=La, Y, Gd).

TABLE I
[Plaque Brightness of $Ln_2O_3$:Eu:Bi Phosphors (Ln=La, Y, Gd)]

| Composition | Relative Brightness | |
|---|---|---|
| | 3,650 A. Excitation | Cathode-Ray Excitation |
| $(Y_{.95}Eu_{.05})_2O_3$ | 5.0 | 97.4 |
| $(Y_{.949}Eu_{.05}Bi_{.001})_2O_3$ | 17.0 | 98.4 |
| $(Y_{.948}Eu_{.05}Bi_{.002})_2O_3$ | 27.0 | 103.4 |
| $(Y_{.95}Eu_{.05})_2O_3$:Bi(50 p.p.m.) | | 98.0 |
| $(Y_{.97}Eu_{.03})_2O_3$ | ~0 | |
| $(Y_{.969}Eu_{.03}Bi_{.001})_2O_3$ | 28.7 | |
| $(Y_{.967}Eu_{.03}Bi_{.003})_2O_3$ | 50.0 | |
| $(Gd_{.95}Eu_{.05})_2O_3$ | 4.5 | 99.0 |
| $(Gd_{.948}Eu_{.05}Bi_{.002})_2O_3$ | 37.6 | 104.1 |
| $(La_{.95}Eu_{.05})_2O_3$ | 5 | |
| $(La_{.945}Eu_{.05}Bi_{.005})_2O_3$ | 35 | |

What I claim as new and desire to secure by Letters Patent of the United States is:

1. A luminescent material having essentially the empirical formula:

$(Ln_{1-x-y}Bi_xEu_y)_2O_3$ wherein

Ln is at least one element selected from the group consisting of lanthanum, yttrium and gadolinium,
$x$ is from about 0.000025 to 0.05, and
$y$ is from about zero to 0.08.

2. A luminescent material according to claim 1 in which $y$ is zero and $x$ has a value of about from 0.000025 to 0.05.

3. A luminescent material according to claim 2 in which $x$ is from about 0.002 to 0.025.

4. A luminescent material according to claim 1 in which $y$ is from about 0.01 to about 0.08.

5. A luminescent material according to claim 4 in which $y$ is from about 0.03 to 0.06.

6. A luminescent material according to claim 5 in which $x$ is from about 0.000025 to 0.01.

References Cited

UNITED STATES PATENTS

| | | | |
|---|---|---|---|
| 3,250,722 | 5/1966 | Borchardt | 252—301.4 |
| 3,322,682 | 5/1967 | Thompson | 252—301.4 |
| 3,360,674 | 12/1967 | Mikus et al. | 252—301.4 |

TOBIAS E. LEVOW, Primary Examiner

R. D. EDMONDS, Assistant Examiner